US012493653B2

(12) United States Patent
Kumar et al.

(10) Patent No.: US 12,493,653 B2
(45) Date of Patent: Dec. 9, 2025

(54) PERSONALIZED RETRIEVAL SYSTEM

(71) Applicant: Roku, Inc., San Jose, CA (US)

(72) Inventors: Kapil Kumar, London (GB); Abhishek Majumdar, Santa Clara, CA (US); Danish Shaikh, Daly City, CA (US); Nitish Aggarwal, Sunnyvale, CA (US); Srimaruti Manoj Nimmagadda, Saratoga, CA (US); Aniruddha Das, Newark, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/398,495

(22) Filed: Dec. 28, 2023

(65) Prior Publication Data

US 2024/0346084 A1 Oct. 17, 2024

Related U.S. Application Data

(60) Provisional application No. 63/496,272, filed on Apr. 14, 2023.

(51) Int. Cl.
*G06F 16/9035* (2019.01)
*G06F 16/9038* (2019.01)
*G06F 40/40* (2020.01)

(52) U.S. Cl.
CPC ...... *G06F 16/9035* (2019.01); *G06F 16/9038* (2019.01); *G06F 40/40* (2020.01)

(58) Field of Classification Search
CPC .............................. G06F 16/9035; G06F 40/40
See application file for complete search history.

(56) References Cited

U.S. PATENT DOCUMENTS

| 2020/0104687 A1* | 4/2020 | Gesmundo | G06N 3/08 |
| 2020/0272913 A1* | 8/2020 | Yu | G06N 20/00 |
| 2021/0174164 A1* | 6/2021 | Hsieh | G06Q 30/0282 |
| 2021/0224486 A1* | 7/2021 | Stabler | G06F 18/2148 |

(Continued)

OTHER PUBLICATIONS

Guo, H. et al., "DeepFM: A Factorization-Machine based Neural Network for CTR Prediction," Proceedings of the 26th International Joint Conference on Artificial Intelligence, Aug. 2017, pp. 1725-1731.

*Primary Examiner* — Apu M Mofiz
*Assistant Examiner* — Farhad Agharahimi
(74) *Attorney, Agent, or Firm* — STERNE, KESSLER, GOLDSTEIN & FOX P.L.L.C.

(57) ABSTRACT

Disclosed are system, method and/or computer program product embodiments that retrieve items for a user based on a query using a two-tower deep machine learning model. An example embodiment provides input to a context tower, wherein the input includes the query and one or more of a query embedding corresponding to the query or a graph user embedding corresponding to the user. The context tower generates a context embedding in a vector space based on the input. The model determines a measure of similarity between the context embedding and each of a plurality of item embeddings in the vector space that are generated by an item tower and represent a plurality of candidate items. A relevancy score is calculated for each candidate item based on the measure of similarity between the context embedding and the corresponding item embedding. The relevancy scores are used for item retrieval and/or ranking.

29 Claims, 9 Drawing Sheets

(56) References Cited

U.S. PATENT DOCUMENTS

| | | | |
|---|---|---|---|
| 2022/0100786 A1* | 3/2022 | Ding | G06N 20/20 |
| 2022/0129621 A1* | 4/2022 | Guda | G06F 18/24 |
| 2022/0215032 A1* | 7/2022 | Li | G06F 16/24578 |
| 2023/0297625 A1* | 9/2023 | Ojo | G06N 3/09 |

* cited by examiner

PERSONALIZED RETRIEVAL SYSTEM

CROSS-REFERENCE TO RELATED APPLICATIONS

This application claims the benefit of U.S. Provisional Patent Application No. 63/496,272, filed on Apr. 14, 2023, the contents of which are incorporated herein by reference in its entirety.

BACKGROUND

Field

This disclosure is generally directed to computer-implemented retrieval systems, and more particularly to computer-implemented retrieval systems that are designed to identify items of interest to a user based on a query.

SUMMARY

Provided herein are system, apparatus, article of manufacture, method and/or computer program product embodiments, and/or combinations and sub-combinations thereof, for retrieving items of interest to a user based on a query. A personalized retrieval system in accordance with an embodiment utilizes a two-tower deep machine learning (ML) model to calculate a relevancy score for each of a plurality of candidate items based on the query. The two-tower deep ML model comprises a context tower that processes at least user features and query features and an item tower that processes item features. Depending upon the implementation, the personalized retrieval system may then select a subset of the candidate items for retrieval based on the relevancy scores associated therewith and/or rank some or all of the candidate items based on the relevancy scores associated therewith.

In some aspects, the input provided to the context tower of the two-tower deep ML model includes the query and one or more of a query embedding corresponding to the query and a graph user embedding corresponding to a user associated with the query. Based on such input, the context tower may generate a context embedding in a vector space. The two-tower deep ML model may then determines a measure of similarity between the context embedding and each of a plurality of item embeddings in the vector space, wherein each item embedding of the plurality of item embeddings may be generated by the item tower of the two-tower deep ML model and may represent a corresponding item in the plurality of candidate items. The personalized retrieval system may then calculate the relevancy score for each candidate item in the plurality of candidate items based on the determined measure of similarity between the context embedding and the item embedding corresponding to the candidate item.

In some aspects, the query embedding corresponding to the query is generated by a neural-network-based language model trained on a text corpus and then tuned based on training data generated from logs of previously-submitted queries and associated user-item interactions.

In some aspects, the graph user embedding is generated by a graph neural network (GNN) based at least on past interactions between the user and one or more candidate items in the plurality of candidate items.

In some aspects, the input provided to the context tower further includes demographics information associated with the user.

In some aspects, generating the context embedding comprises projecting the query into a plurality of query embedding spaces to generate a corresponding plurality of query projection embeddings, and generating the context embedding based at least on the query embedding, the graph user embedding, and the plurality of query projection embeddings.

In some aspects, the item tower generates each item embedding of the plurality of item embeddings based on: information indicative of a popularity level of the corresponding candidate item; an item identifier (ID) associated with the corresponding candidate item; metadata associated with the corresponding candidate item; and a graph item embedding generated by the GNN and associated with the corresponding candidate item.

In some aspects, training data is generated for the two-tower deep ML model by determining that a query comprising a sequence of characters is associated with a prior user interaction with a particular candidate item and, based on the determination, generating a separate training record for each contiguous subsequence of characters in the sequence of characters that starts with a first character in the sequence of characters, wherein each training record associates the corresponding contiguous subsequence with the prior user interaction with the particular candidate item.

In some aspects, the two-tower deep ML model is trained by minimizing a loss function that includes a first term that represents categorical cross entropy for multiple candidate classification, a second term that represents binary cross entropy to predict probability of a first type of user-item interaction, and a third term that represents binary cross entropy to predict probability of a second type of user-item interaction.

BRIEF DESCRIPTION OF THE FIGURES

The accompanying drawings are incorporated herein and form a part of the specification.

DETAILED DESCRIPTION

Retrieval systems exist that accept a query submitted by a user and then, based on the query, attempt to identify items of interest to the user. For example, some digital media players incorporate a search feature that enables users to submit queries to obtain access to desired media content, such as music, videos, movies, TV programs, or the like. Some conventional retrieval systems are designed to identify items of interest while the user is typing or otherwise inputting a query. For example, after each character of the query is entered, such systems may analyze what the user has input so far—even if it is only one character or a few characters and not a complete word—and attempt to identify items of interest based on the current input. If there are a large number of candidate items to choose from, such systems may not be able to identify relevant items based on only a very small number of input characters. Consequently, such systems may require the user to input a fairly lengthy query before relevant items can be identified. This increases the amount of time and effort it takes for the user to locate items of interest, thus negatively impacting the user experience.

Furthermore, some conventional retrieval systems divide the retrieval process into two stages. First, during a retrieval stage, a set of items deemed relevant to a query is identified. Then, in a ranking stage, a relevancy score is calculated for each item in the set of items and those items are ranked according to their corresponding relevancy scores. Such ranking enables the items to be presented to the user in order of relevancy. In a scenario in which the query comprises only a small number of characters and the inventory of candidate items is very large, the number of items identified in the retrieval stage may also be very large. Consequently, the ranking stage must calculate the relevancy score for a very large number of items, which can be expensive in terms of consumed processor cycles, memory and other computing resources, as well as time-consuming, leading to poor response times for the retrieval system.

Provided herein are system, apparatus, device, method and/or computer program product embodiments, and/or combinations and sub-combinations thereof, for retrieving items of interest to a user based on a query. A personalized retrieval system in accordance with an embodiment utilizes a two-tower deep machine learning (ML) model to calculate a relevancy score for each of a plurality of candidate items based on the query. The two-tower deep ML model comprises a context tower that processes at least user features and query features and an item tower that processes item features. Depending upon the implementation, the personalized retrieval system may then select a subset of the candidate items for retrieval based on the relevancy scores associated therewith and/or rank some or all of the candidate items based on the relevancy scores associated therewith.

Figure 1:
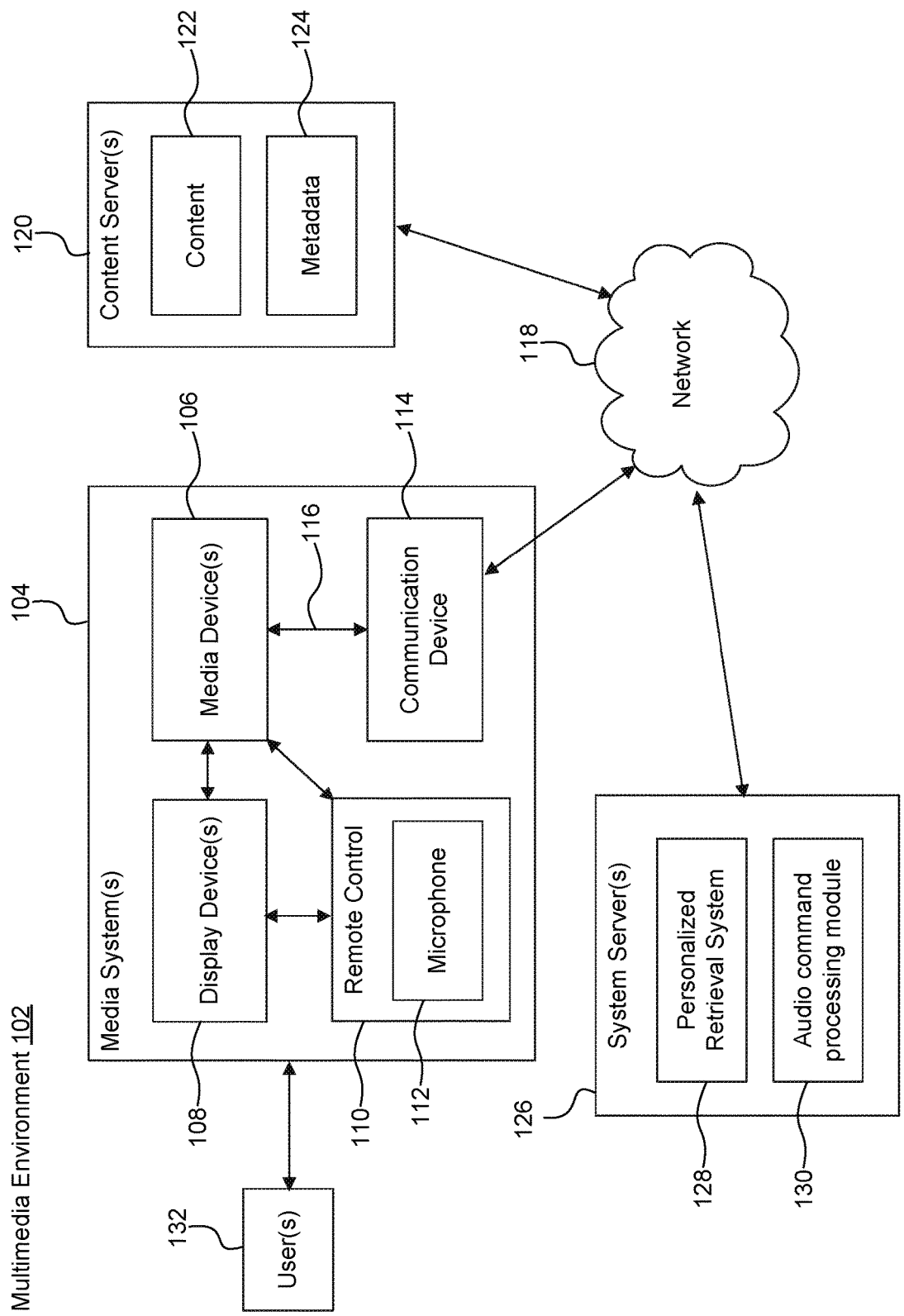
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

System servers 126 may include a personalized retrieval system 128 that enables user 132 to search for and locate items of interest, such as particular content items stored by content servers 120. For example, media device 106 may provide a search interface (e.g., a graphical user interface (GUI)) that is presented to user 132 via display device 108. User 132 may enter a query into the search interface. For example, user 132 may use buttons or other mechanical features of remote control 110 to enter the query, or may speak the query into microphone 112. The query may be transmitted to personalized retrieval system 128 via network 118. Personalized retrieval system 128 may select, based on the query as well as on other information available thereto relating to the user and to the content items, a set of content items that is deemed relevant to the query. Personalized retrieval system 128 may then transmit an identification of the selected content items (e.g., a list of titles and/or other information about the selected content items) to media device 106 for presentation to user 132 via the search interface. The search interface may include controls that a user may interact with to obtain additional information about each content item that is identified and/or to play each content item.

Further details concerning an example implementation of personalized retrieval system 128 will be provided below in reference to FIGS. 2-10.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108. Also, as noted above, the audio data may comprise a spoken query.

In some embodiments, the audio data received by microphone 112 in remote control 110 is transferred to media device 106, which then forwards the audio data to audio command processing module 130 in system servers 126. Audio command processing module 130 may operate to process and analyze the received audio data to recognize a verbal command of user 132. Audio command processing module 130 may then forward the verbal command back to media device 106 for processing. Audio command processing module 130 may also operate to process and analyze the received audio data to recognize a spoken query of user 132. Audio command processing module 130 may then forward the spoken query to personalized retrieval system 128 for processing.

Figure 2:
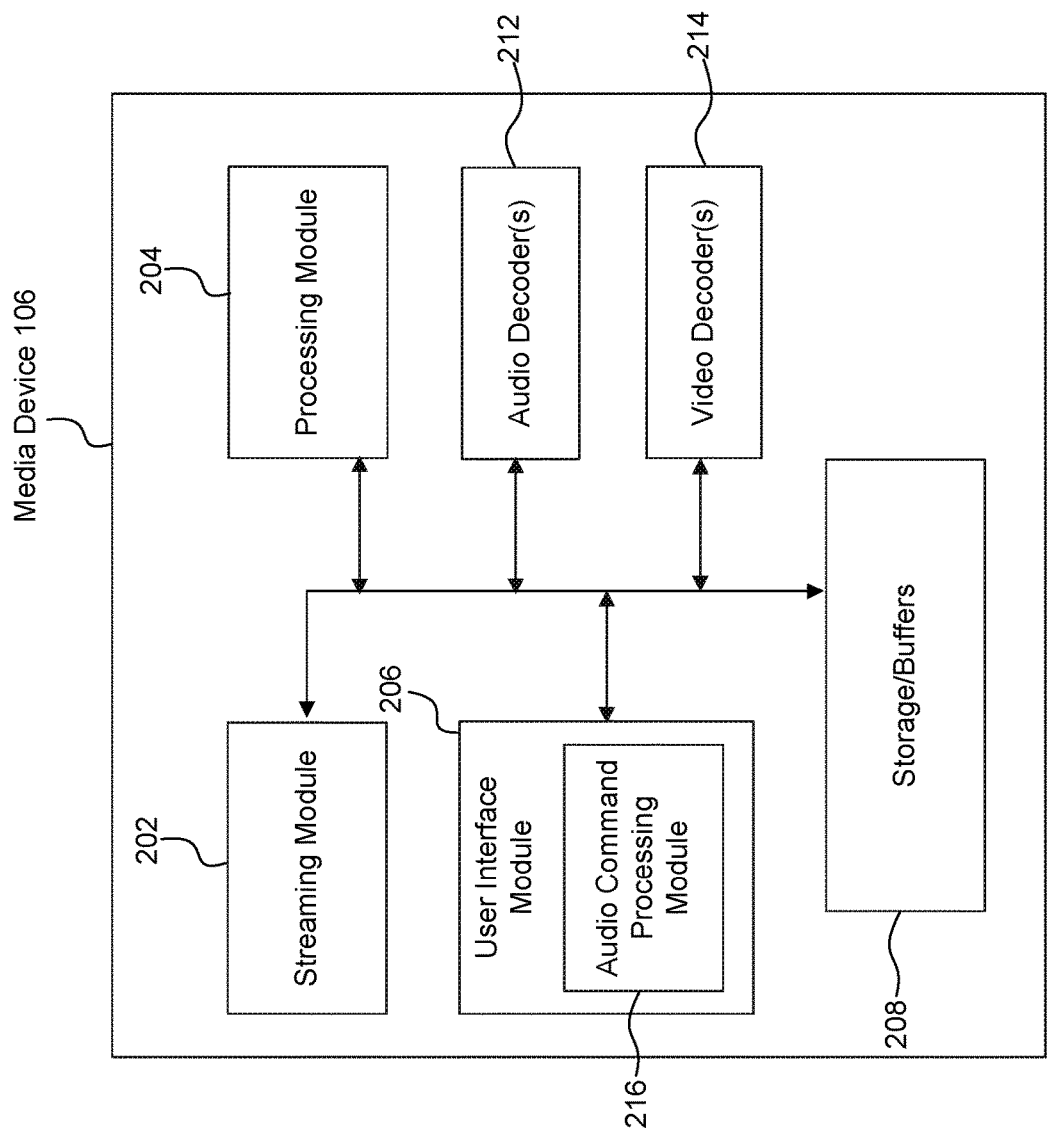
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands or spoken queries to process (either the verbal command or spoken query recognized by audio command processing module 130 in system servers 126, or the verbal command or spoken query recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. User interface module 206 may be configured to present a search interface associated with personalized retrieval system 128 to user 132 via display device 108. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select a content item, such as a movie, TV show, music, book, application, game, etc. For example, user 132 may select a content item from among a list of content items generated by personalized retrieval system 128 based on query submitted by user 132. In response to the user selection, streaming module 202 of media device 106 may request the selected content item from content server(s) 120 over network 118. Content server(s) 120 may transmit the requested content item to streaming module 202. Media device 106 may transmit the received content item to display device 108 for playback to user 132.

In streaming embodiments, streaming module 202 may transmit the content item to display device 108 in real time or near real time as it receives such content item from content server(s) 120. In non-streaming embodiments, media device 106 may store the content item received from content server(s) 120 in storage/buffers 208 for later playback on display device 108.

Personalized Retrieval System

Figure 3:
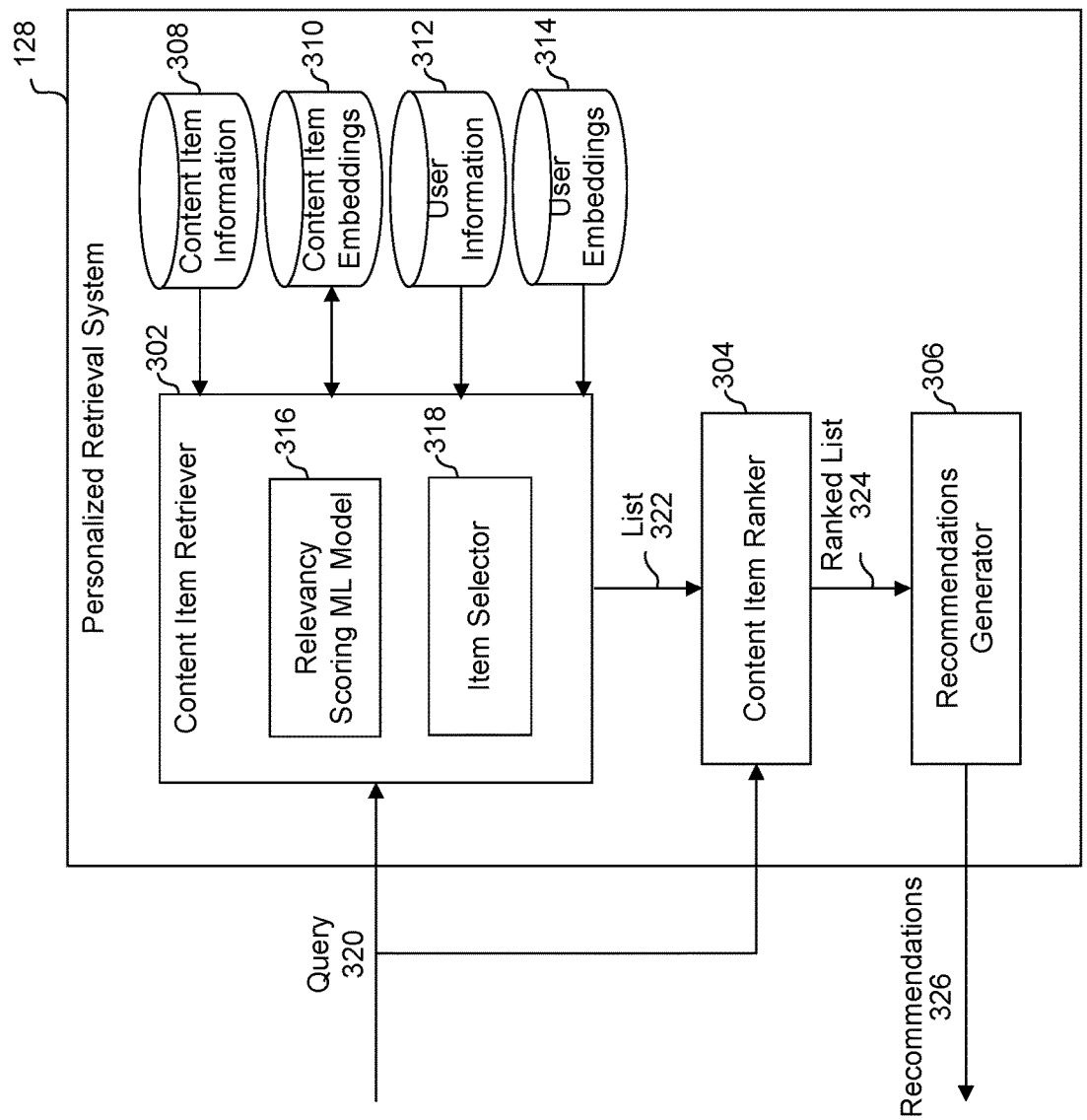
FIG. 3 illustrates a block diagram of a personalized retrieval system, according to some embodiments.

FIG. 3 illustrates a block diagram of personalized retrieval system 128, according to some embodiments. As noted above, personalized retrieval system 128 may be implemented by system server(s) 126 in multimedia environment 102 of FIG. 1. As will be discussed herein, personalized retrieval system 128 may use a two-tower deep ML model to calculate a relevancy score for each of a plurality of candidate content items based on a query. The two-tower deep ML model may comprise a context tower that processes at least user features and query features and an item tower that processes content item features. Personalized retrieval system 128 may select a subset of the candidate content items for retrieval based on the relevancy scores associated therewith and/or rank some or all of the candidate content items based on the relevancy scores associated therewith.

As shown in FIG. 3, personalized retrieval system 128 comprises a content item retriever 302, a content item ranker 304, and a recommendations generator 306.

Content item retriever 302 is configured to receive a query 320 submitted by a user and, based at least on query 320, identify one or more content items stored by content servers 120 that are deemed relevant to query 320. As discussed above, user 132 may submit query 320 via a search interface associated with personalized retrieval system 128, wherein the search interface may be rendered to display device 108 by media device 106. Media device 106 may transmit a query to personalized retrieval system 128 each time user 132 enters a new query character into the search interface. Thus, query 320 may consist of a first character of a word or only the first few characters of a word, but not a complete word. However, this is only one example use case, and query 320 may also comprise any combination of words and/or characters.

Content item retriever 302 is configured to receive query 320 and identify a set of content items stored by content servers 120 that are deemed relevant to query 320. Content item retriever 302 is further configured to pass a list 322 that identifies the content items in the set to content item ranker 304. Content item retriever 302 may be configured to limit the size of the set to a predefined number. This may be done, for example, in order to reduce a processing burden on content item ranker 304 and/or improve a response time of personalized retrieval system 128. For example, content item retriever 302 may be configured to cap the size of the set to 100 or 150 content items, although these are merely examples and are by no means limiting.

Content item ranker 304 is configured to receive query 320 and list 322. Content item ranker 304 is further configured to calculate, based at least on query 320, a relevancy score for each content item identified in list 322. Content item ranker 304 is still further configured to generate a ranked list 324 of the content items in which the items are ranked from highest relevancy score to lowest relevancy score, and to pass ranked list 324 to recommendations generator 306.

Recommendations generator 306 is configured to receive ranked list 324 and to generate recommendations 326 based thereon. Recommendations 326 may comprise, for example, information associated with each content item identified in ranked list 324 (e.g., a title of the content item, an icon or image associated with the content item, a content description associated with the content item, a link that activates playback of the content item, or the like). Recommendations generator 306 is further configured to transmit recommendations 326 to media device 106. Media device 106 may present such information to user 132 via a search interface rendered to display device 108. The search interface may enable user 132 to interact with (e.g., click on) a first GUI control associated with each content item included within recommendations 326 to obtain additional information about the corresponding content item and/or a second GUI control associated with each content item included within recommendations 326 to play back (e.g., stream) the corresponding content item.

It is desirable that content item retriever 302 successfully identify the content items that are most relevant to user 132 based on query 320, even if query 320 may consist of only one character or a few characters. This may enable user 132 to more quickly locate and potentially play back a content item of interest, which can greatly improve their user experience as well as conserve system resources (e.g., resources of media device 106 and system servers 126) by avoiding additional searches. Additionally, if content item retriever 302 can consistently identify the most relevant content items, then the cap on the number of content items that are passed from content item retriever 302 to content item ranker 304 can be reduced. Reducing this cap can reduce the processing burden on content item ranker 304, which means that processor cycles, memory and other computing resources of system servers 126 can be conserved. Reducing the processing burden on content item ranker 304 can also improve a response time for personalized retrieval system 128 (e.g., a time between submission of query 320 and the return of recommendations 326).

Precisely identifying content items relevant to a user based on a relatively small number of query characters can be extremely challenging. To address this issue, content item retriever 302 includes a relevancy scoring machine learning (ML) model 316 that accepts as input a number of context features, wherein the context features include query features, user features, and potentially other features relating to the submission of query 320 (e.g., time of day of submission of query 320), and a number of content item features associated with each candidate content item in a plurality of candidate content items, to generate a relevancy score for each candidate content item. Based on the relevancy scores, an item selector 318 selects the highest-scoring candidate content items up to a fixed number of candidate content items and passes an identification of these candidate content items to content item ranker as list 322.

Content item retriever 302 may obtain or derive the user features that are input to relevancy scoring ML model 316 from user information stored in a user information data store 312 and/or from user embeddings stored in a user embeddings data store 314. Content item retriever 302 may be capable of identifying a user associated with query 320 (e.g., user 132) in a variety of ways and then obtain the relevant user information and/or user embeddings associated with the identified user from user information data store 312 and/or user embeddings data store 314. For example, query 320 may be transmitted from media device 106 along with a user identifier (ID), device ID, network address (e.g., IP address) and/or other information that can be used by content item retriever 302 to identify a user associated with query 320.

Content item retriever 302 may obtain or derive the content item features that are input to relevancy scoring ML model 316 from content item information stored in a content item information data store 308 and/or from content item embeddings stored in a content item embeddings data store 310. Content item information data store 308 may comprise metadata 124 as previously described in reference to FIG. 1.

It is noted that in an alternate implementation of personalized retrieval system 128, the process of retrieving relevant content items and then ranking such items may be an integrated process in which various user-related inputs and item-related inputs are processed to retrieve relevant content items in a ranked order. In accordance with such an implementation, content item retriever 302 and content item ranker 304 may be replaced by a single entity that generates a list of relevant content items in a ranked order. Such an implementation may use relevancy scoring ML model 316 to obtain the list of relevant content items in a ranked order.

Figure 4:
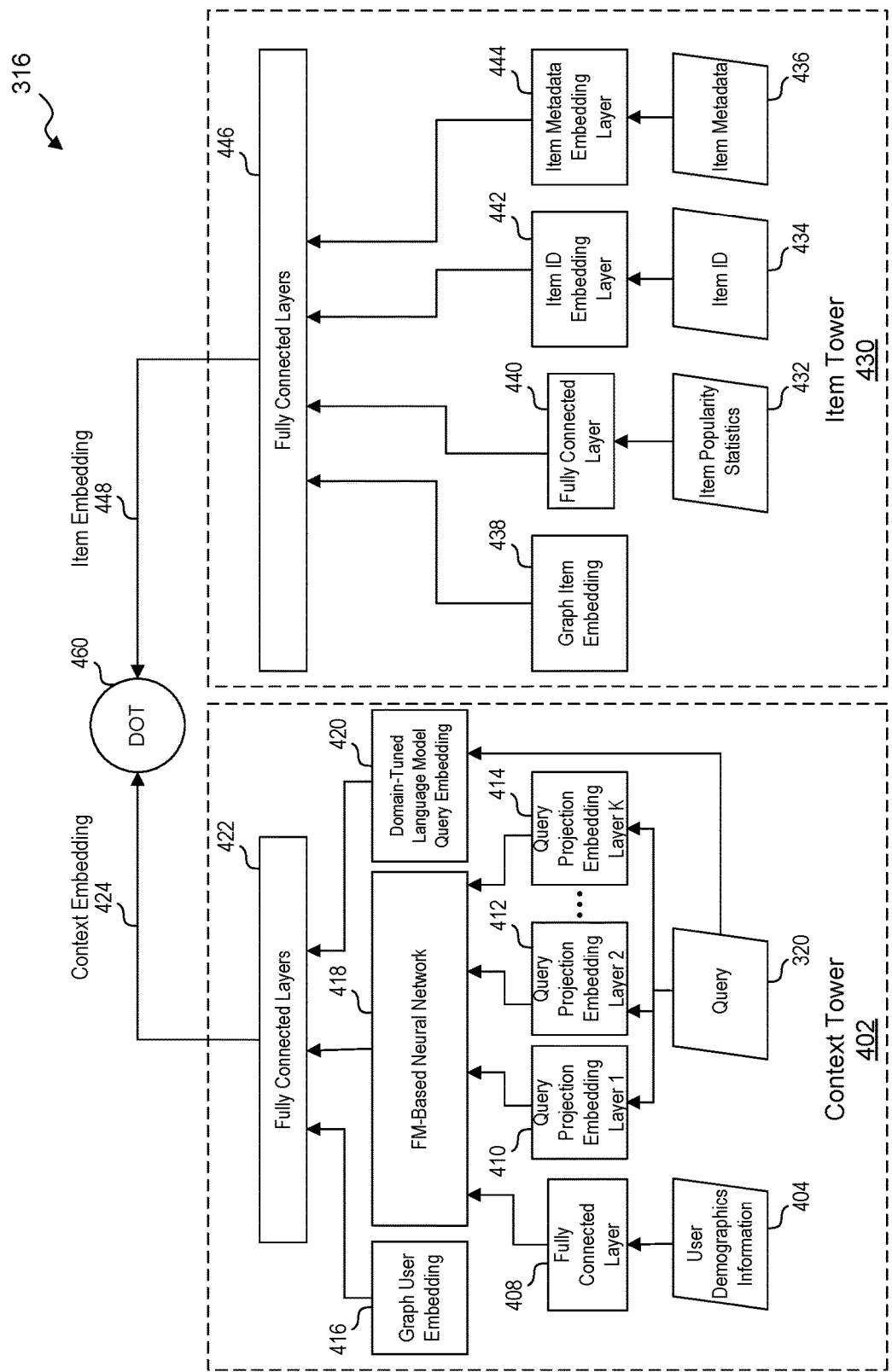
FIG. 4 illustrates a block diagram of an ML model used to calculate a relevancy score for each of a plurality of candidate items based on a query, according to some embodiments.

FIG. 4 illustrates a block diagram of relevancy scoring ML model 316, according to some embodiments. In the embodiment shown in FIG. 4, relevancy scoring ML model 316 is a two-tower deep ML model that includes a context tower 402 and an item tower 430. Context tower 402 accepts as input a number of query features, user features, and potentially other features relating to the submission of a query by a user (e.g., a time of day the query was submitted), and processes those features to generate a context embedding 424 (or context vector) in a vector space. Item tower 430 accepts as input a number of item features relating to a candidate content item and processes those features to generate an item embedding 448 (or item vector) in the same vector space. Relevancy scoring ML model 316 further includes an operator 460 that calculates a dot product of context embedding 424 and item embedding 448. The dot product calculated by operator 460 is a scalar value that represents a measure of similarity between context embedding 424 and item embedding 448. In some implementations, the dot product calculated by operator 460 is used as the relevancy score for the candidate content item represented by item embedding 448. Alternatively, the dot product may be one of a plurality of features used to determine the relevancy score for the candidate content item represented by item embedding 448.

It should be noted that, although embodiments described herein use relevancy scoring ML model 316 to generate relevancy scores for content items, the model may generally be applied to generate relevancy scores for any type of item. Furthermore, although relevancy scoring model 316 is described herein as being used for item retrieval, the model may also be used for item ranking. For example, content item ranker 304 may use relevancy scoring ML model 316 to rank content items identified in list 322 from highest relevancy score to lowest relevancy score.

Context Tower Inputs

As shown in FIG. 4, context tower 402 receives the following inputs: query 320, user demographics information 404, a graph user embedding 416, and a domain-tuned language model query embedding 420.

User Demographics Information

User demographics information 404 may include demographic information about a user associated with query 320. Such demographic information may include, but is not limited to, one or more of age, gender, location (e.g., state and/or country of residence), marital status, number of children, occupation, annual income, education level, living status (homeowner or renter). User demographics information 404 may be represented in a variety of ways including but not limited to probability distribution vectors for certain demographic features (e.g., age and gender) and one hot vectors for other demographic information (e.g., state and country). However, these are examples only and are not intended to be limiting.

Graph User Embedding

Graph user embedding 416 may comprise a user embedding that corresponds to a user associated with query 320 (e.g., user 132) and that is generated by a graph neural network (GNN) based on at least in part on past interactions between the user and one or more content items. The GNN may be a deep learning model that is trained on data derived from logs of past interactions between users of personalized retrieval system 128 and content items. Such past interactions may include, for example and without limitation, a user being shown a representation of and/or information about a content item, a user clicking on or otherwise interacting with a GUI control to obtain information about a content item, or a user playing a content item. The GNN may be capable of learning embeddings for attributes of a graph in which users and content items are represented as nodes and in which relationships (e.g., past interactions) between users and content items are represented as edges. Such a GNN may be referred to as a heterogeneous GNN (HGNN) since the model is designed to handle graph-structured data with multiple types of nodes or edges. In one implementation, the HGNN is a heterogeneous GraphSage (HinSAGE) model.

Domain-Tuned Language Model Query Embedding

Domain-tuned language model query embedding 420 may comprise an embedding corresponding to query 320 that is generated by a neural-network-based language model trained on a large text corpus and then tuned based on training data generated from logs of previously-submitted queries and associated user-item interactions.

For example, the neural-network-based language model trained on the large text corpus may comprise one of fastText, Word2Vec, or GloVe, although these are only examples. Since such language models are trained on very large and typically non-domain-specific text corpuses, they generalize to broad topics but fail to be specific in a particular domain such as a business that involves delivering content to users. To address this issue, in accordance with one implementation, one of these language models is tuned (e.g., modified through additional training) based on training data generated from logs of previously-submitted queries and associated user-content item interactions.

For example, logs of previously-submitted queries and associated user-content item interactions may be used to generate training records, wherein each training record associates a query with word and character features of a title of a content item that was launched for playback as a result of submission of the query.

In further accordance with such an example, user search logs over a particular time period (e.g., 30 days) may be analyzed to determine a frequency distribution of launches per content item for a given query. Based on this information, a query launch frequency distribution may be computed. A first document may then be created with distinct queries (represented as rows) replicated by their log frequency count for every given content item. Thus, for example, if the log frequency count for query "F" being used to launch the movie "Finding Nemo" is 5 and the log frequency count for query "FI" being used to launch the movie "Finding Nemo" is 20, then the first document may include 5 records associating the query "F" with a content ID of the movie "Finding Nemo" and 20 records associating the query "FI" with the content ID of the movie "Finding Nemo".

In further accordance with this particular example, for every content item, word and character features may be extracted from the complete title using natural language processing (NLP) practices such as n-grams, edge-n grams, and word segmentation. The frequency and log frequency distribution of the content item launches may be computed. A second document may then be created with distinct word and character features for each content item (represented as rows), replicated by the content item's log frequency count. Thus, for example, if the log frequency count for launches of the movie "Finding Nemo" is 25, then the second document may include 25 records associating the content ID of the movie "Finding Nemo" with the word and character features of the title "Finding Nemo".

In still further accordance with this particular example, training data may be generated by merging the first document with the second document by content item (e.g. by content item ID), thereby generating a final document in which each row associates a query with the word and character features of the title of a content item launched for playback as a result of submission of that query, and wherein the number of rows for any given query-content item mapping represents the log frequency count of launches of that content item based on that query. Thus, in accordance with the running example, the final document may include 5 records associating the query "F" with the word and character features of the title "Finding Nemo" and 20 records associating the query "FI" with the word and character features of the title "Finding Nemo".

This training data may then be used to retrain a neural-network-based language model trained on a large text corpus (e.g., fastText, Word2Vec, or GloVe) as either a continuous bag of words (CBOW) or Skip-Gram.

It will be appreciated that the foregoing is only one example of a way in which logs of previously-submitted queries and associated user-content item interactions may be used to generate training records for retraining a neural-network-based language model trained on a large text corpus, and is not intended to be limiting. Other techniques may be used.

Time of Day Information

Although not shown in FIG. 4, context tower 402 may also receive as an input a time of day associated with query 320. For example, the time of day information may reflect the time at which query 320 was submitted.

Context Tower Architecture

As shown in FIG. 4, context tower 402 includes a fully connected layer 408, a plurality of query projection embedding layers 410, 412 and 414, a factorization machine (FM) based neural network 418, and a series of fully connected layers 422.

Fully connected layer 408 is configured to receive user demographics information 408 and produce an output vector based thereon.

Each of query projection embedding layers 410, 412, 414 is configured to receive query 320 and project it into a different query embedding space, thereby generating three different query projection embeddings. Although three different query projection embedding layers are shown in FIG. 4, a different number may be used depending upon the implementation. For example, the number of different query projection embedding layers may be varied depending upon an observed improvement or worsening in the quality of the measures of similarity generated by relevancy scoring ML model 316.

In certain implementations, each of query projection embedding layers 410, 412 and 414 is assigned a different hash function (e.g., a MurmurHash non-cryptographic hash function with a different seed value). Each of query projection embedding layers 410, 412 and 414 applies its respective hash function to query 320 to generate a corresponding vector representation of query 320. Each of query projection embedding layers 410, 412, and 414 then applies a set of weights to its respective vector representation to produce a query projection embedding of query 320, wherein the set of weights applied by each layer are learned during training of relevancy scoring ML model 316.

It has been observed that generating multiple query projection embeddings in multiple respective query embedding spaces can improve the quality of the relevancy scores generated by relevancy scoring ML model 316 as compared to generating only a single query projection embedding in a single query embedding space. Such improvement in performance may be due to the fact that embedding collisions between queries that may occur in one query embedding space (due to the fact that a given hash function may produce the same vector representation for multiple queries), may not occur in another query embedding space by virtue of the fact that each query embedding space uses a different hash function. Such improvement in performance may also be due to the fact that the number of dimensions used to represent a given query is increased when the number of query projection embeddings is multiplied. Still further, such improvement in performance may be a by-product of ensemble averaging of the outputs of the different query projection embedding layers 410, 412 and 414.

FM-based neural network 418 is configured to receive the output vector generated by fully connected layer 408 and the query projection embeddings respectively generated by query projection embedding layers 410, 412 and 414 and to produce an output vector based thereon. FM based neural network 418 may comprise a neural network that integrates the architectures of FM and deep neural networks (DNN) in a parallel structure. The FM component may comprise a 2-way factorization machine that is used to model low-order feature interactions, while the deep component may comprise a multi-layer perceptron (MLP) that is used to capture high-order feature interactions and non-linearities. For example, FM based neural network 418 may comprise the DeepFM model described in "DeepFM: A Factorization-Machine based Neural Network for CTR Prediction", IJCAI'17: Proceedings of the 26th International Joint Conference on Artificial Intelligence, August 2017, pages 1725-1731, the entirety of which is incorporated by reference herein, or a similar model. However, this is only an example and is not intended to be limiting.

Although not shown in FIG. 4, context tower 402 may further comprise an additional fully connected layer that receives the aforementioned time of day information and generates an output vector based thereon. This output vector may be provided as an additional input to FM-based neural network 418.

Fully connected layers 422 are configured to receive graph user embedding 416, the output vector generated by FM-based neural network 418, and domain-tuned language model query embedding 420 and to generate context embedding 424 based thereon.

Item Tower Inputs

As shown in FIG. 4, item tower 430 receives the following inputs: an item identifier (ID) 434, item metadata 436, item popularity statistics 432, and a graph embedding 438.

Item ID

Item ID 434 comprises an identifier that is (e.g., uniquely) associated with the candidate content item for which item embedding 448 is to be generated.

Item Metadata

Item metadata 436 comprises metadata associated with the candidate content item for which item embedding 448 is to be generated. Such metadata may include any of a wide variety of descriptors associated with a content item, including but not limited to title, preview image, content description, genre, running time, release year, rating information, language, directors, actors, or the like.

Item Popularity Statistics

Item popularity statistics 432 may comprise information indicative of a level of popularity associated with the candidate content item for which item embedding 448 is to be generated. Item popularity statistics 432 may be calculated based on logged records of past user interactions with content items. By way of example, item popularity statistics 432 may comprise a frequency with which users were shown a representation of and/or information about a content item, clicked on (or otherwise interacted with) a GUI control to obtain information about a content item, or played a candidate content item. Item popularity statistics may also include a total number of hours a content item was watched. Depending upon the implementation, item popularity statistics 432 may be limited to a particular period of time (e.g., past 30 days) to account for changing content item popularity.

Graph Item Embedding

Graph item embedding 438 may comprise an item embedding that corresponds to the content item for which item embedding 448 is to be generated and is generated by the same GNN used to generate graph user embedding 416. As previously noted, the GNN may be a deep learning model that is trained on data derived from logs of past interactions between users of personalized retrieval system 128 and content items. Such past interactions may include, for example and without limitation, a user being shown a representation of and/or information about a content item, a user clicking on or otherwise interacting with a GUI control to obtain information about a content item, or a user playing a content item. The GNN may be capable of learning embeddings for attributes of a graph in which users and content items are represented as nodes and in which relationships (e.g., past interactions) between users and content items are represented as edges. Such a GNN may be referred to as a heterogeneous GNN (HGNN) since the model is designed to handle graph-structured data with multiple types of nodes or edges. In one implementation, the HGNN is a heterogeneous GraphSage (HinSAGE) model.

Item Tower Architecture

As shown in FIG. 4, item tower 430 includes a fully connected layer 440, an item ID embedding layer 442, an item metadata embedding layer 444, and a series of fully connected layers 446.

Fully connected layer 440 is configured to receive item popularity statistics 432 and produce an output vector based thereon.

Item ID embedding layer 442 is configured to receive item ID 434 and project it into an item ID embedding space, thereby generating an item ID embedding. In embodiments, item ID embedding layer 442 is assigned a hash function which it applies to item ID 434 to generate a corresponding vector representation of item ID 434. Item ID embedding layer 442 then applies a set of weights to this vector representation to produce an item ID embedding of item ID 434, wherein the set of weights applied by item ID embedding layer 442 is learned during training of relevancy scoring ML model 316.

Item metadata embedding layer 444 is configured to receive item metadata 436 and project it into an item metadata embedding space, thereby generating an item metadata embedding. In embodiments, item metadata embedding layer 444 is assigned a hash function which it applies to item metadata 436 to generate a corresponding vector representation of item metadata 436. Item metadata embedding layer 444 then applies a set of weights to this vector representation to produce an item metadata embedding of item metadata 436, wherein the set of weights applied by item metadata embedding layer 444 is learned during training of relevancy scoring ML model 316.

Fully connected layers 446 are configured to receive graph item embedding 438, the output vector generated by fully connected layer 440, the item ID embedding generated by item ID embedding layer 442, and the item metadata embedding generated by item metadata embedding layer 44 and to generate item embedding 448 based thereon.

In some implementations, item tower 430 of relevancy scoring ML model 316 may be periodically or intermittently executed to generate item embeddings for a library of content items that are retrievable by personalized retrieval system 128 and these content item embeddings may be stored in content item embeddings data store 310 where they can be accessed by content item retriever 302 (as shown in FIG. 3). In further accordance with such an implementation, when a user submits a query, relevancy scoring ML model 316 may utilize context tower 402 to generate a context embedding corresponding to the query and then compute the dot product of the context embedding and each content item embedding stored in content item embeddings data store 310. This approach avoids having to generate an item embedding for each candidate content item in the library at the time the query is submitted. However, this is only an example, and in other implementations item embeddings for candidate content items may be generated at the time a query is received.

Model Training

Figure 5:
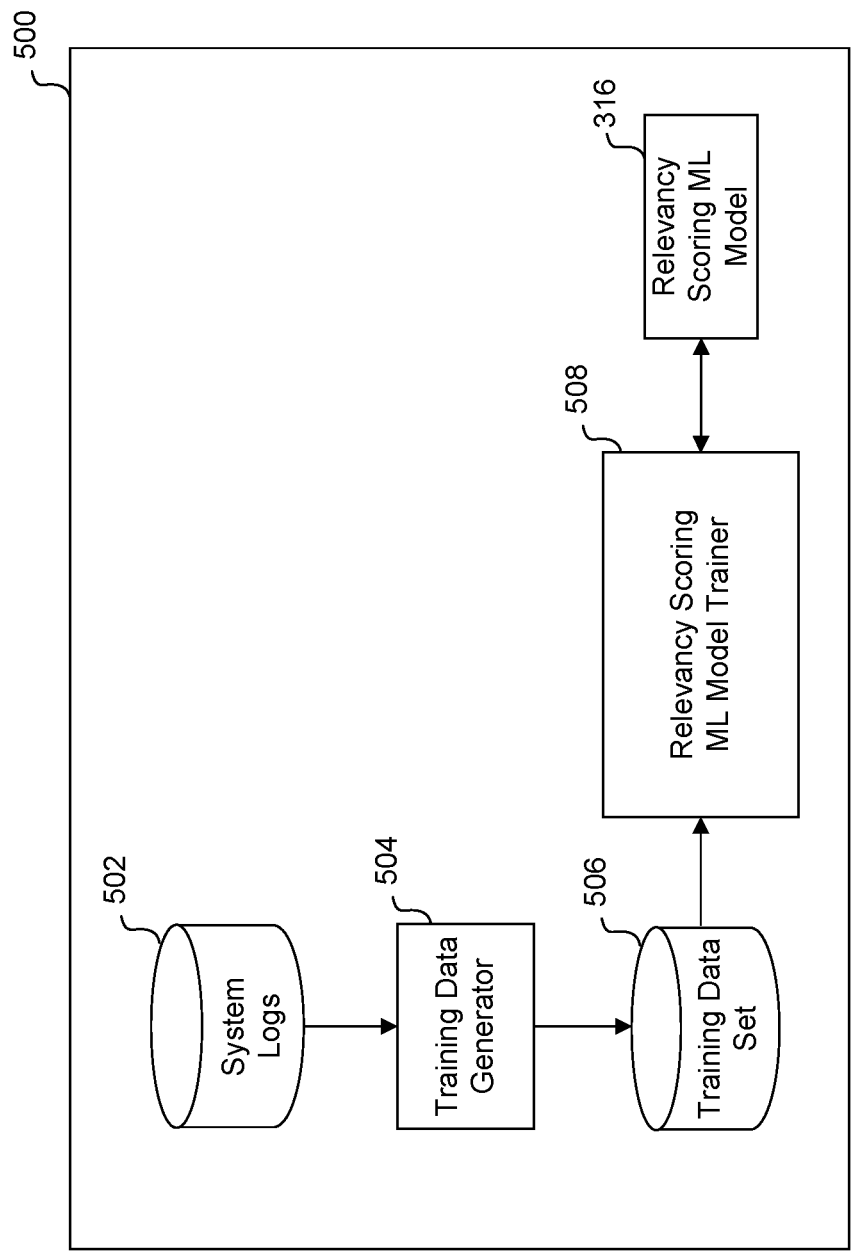
FIG. 5 illustrates a block diagram of a system for training an ML model, according to some embodiments.

FIG. 5 illustrates a block diagram of a system 500 for training relevancy scoring ML model 316, according to some embodiments. System 500 includes a relevancy scoring ML model trainer 508. Relevancy scoring ML model trainer 508 is configured to utilize a training data set 506 to train relevancy scoring ML model 316. This process may entail modifying parameters (e.g., weights) associated with certain elements of relevance scoring ML model 316 based on training data set 506. For example, this process may entail modifying weights associated with fully connected layer 408, query projection embedding layer 410, query projection embedding layer 412, query projection embedding layer 414, FM-based neural network 418, fully connected layers 422, fully connected layer 440, item ID embedding layer 442, item metadata embedding layer 444, and fully connected layers 446 of relevancy scoring ML model 316 based on training data set 506.

System 500 may further include a training data generator 504 that is configured to generate some or all of training data set 506 based on data derived from system logs 502 that record previously-submitted queries and an indication of whether the submission of such queries led to one or more user-content item interactions. Such user-item content interactions may include, for example, a user being shown a representation of or information about a content item (which may be referred to as an "impression"), a user clicking on or otherwise interacting with a GUI control to obtain information about a content item, or a user playing a content item.

In embodiments, training data generator 504 is configured to extrapolate from data in system logs 502 to generate additional training records in training data set 502. In accordance with such embodiments, when training data generator 504 determines that a query comprising a sequence of characters is associated with a prior user interaction with a particular content item, training data generator 504 may generate a separate training record for each contiguous subsequence of characters in the sequence of characters that starts with a first character in the sequence of characters, wherein each training record associates the corresponding contiguous subsequence with the prior user interaction with the particular candidate item.

By way of example, assume that training data generator determines, based on data stored in system logs 502, that a user previously typed the query "find" and based on recommendations received from personalized retrieval system 128, played the movie "Finding Nemo". Assuming that this is a system in which a query is submitted each time the user types in a character, then the user may have previously submitted the queries "f", "fi", and "fin" with the intention of watching "Finding Nemo", but system logs 502 may only reflect the relationship between the query "find" and the movie "Finding Nemo" for that user. For example, the user may only have been shown the content item "Finding Nemo" based on the query "find", but not based on the prior queries "f", "fi", and "fin", and thus could only interact with that content item after typing "find".

Consequently, in some implementations, training data generator 504 may operate to enrich the training data for this user by creating a separate training record for each contiguous subsequence of characters in the sequence of characters "find" that starts with the first character "f" in the sequence of characters. In other words, training data generator 504 may create a separate training record for each of the following contiguous subsequences of "find": "f", "fi", "fin" and "find", wherein each training record will associate a respective one of the contiguous subsequences with the user-content item interaction of the user watching "Finding Nemo". Such enrichment of training data set 506 to reflect user intent by training data generator 504 can improve the performance of relevancy scoring ML model 316 by enabling the model to identify relevant content items for users based on fewer query input characters.

In certain implementations, relevancy scoring ML model trainer 508 trains relevancy scoring ML model 316 by modifying parameters (e.g., weights) of the model through backpropagation based on examples in training data set 506 in a manner that minimizes a particular loss function. In one particular embodiment, the loss function comprises a plurality of terms including a first term that represents categorical cross entropy for multiple candidate classification, a second term that represents binary cross entropy to predict probability of a first type of user-item interaction, and a third term that optimizes binary cross entropy to predict probability of a second type of user-item interaction. For example, the first type of user-item interaction may comprise a user clicking on or otherwise interacting with a GUI control to obtain information about a content item, and the second type of user-item interaction may comprise a user playing a content item. However, this is only an example and different loss functions may be used to train relevancy scoring ML model 316.

Figure 6:
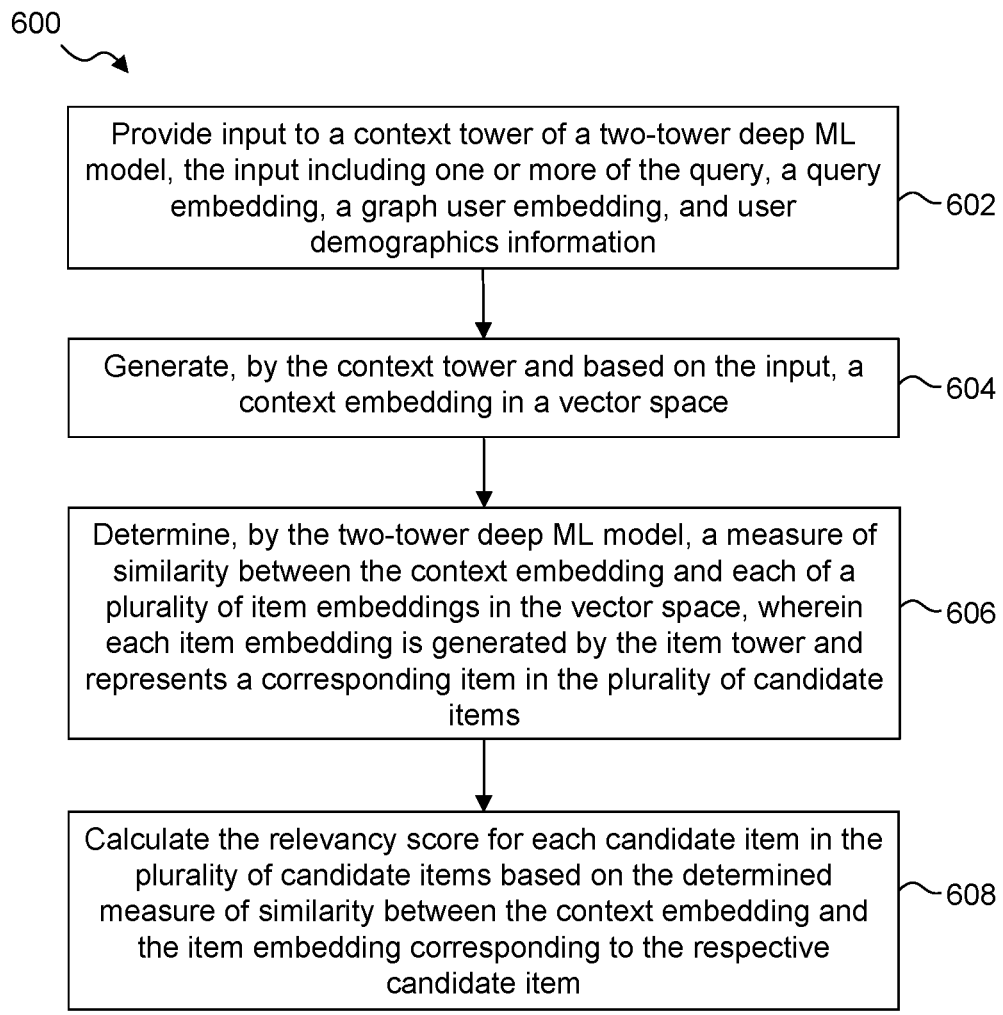
FIG. 6 illustrates a flow diagram of a method for calculating a relevancy score for each of a plurality of candidate items based on a query, according to some embodiments.

FIG. 6 is a flow diagram for a method 600 for calculating a relevancy score for each of a plurality of candidate items based on a query, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIGS. 3 and 4. However, method 600 is not limited to that example embodiment.

In 602, content item retriever provides input to context tower 402 of a two-tower deep ML model (e.g., relevancy scoring ML model 316 shown in FIG. 4), the input including one or more of query 320, a query embedding (e.g., domain-tuned language model query embedding 420), graph user embedding 416, and user demographics information 404. In a further embodiment, the input may also include time of day information.

In 604, context tower 402 generates, based on the input, context embedding 424 in a vector space.

In 606, the two-tower deep ML model (e.g., relevancy scoring ML model 316 shown in FIG. 4) determines a measure of similarity between context embedding 424 and each of a plurality of item embeddings 448 in the vector space, wherein each item embedding 448 is generated by item tower 430 and represents a corresponding item in the plurality of candidate items. As noted above, operator 460 may determine the measure of similarity by calculating a dot product of context embedding 424 and each item embedding 448.

In 608, item selector 318 calculates the relevancy score for each candidate item in the plurality of candidate items based on the determined measure of similarity between context embedding 424 and the item embedding 448 corresponding to the candidate item.

In one implementation, the relevancy scores generated in step 608 are used to select a subset of the candidate items for retrieval based on the relevancy scores associated therewith. For example, item selector 318 of content retriever 302 may use the relevancy scores generated in step 608 to select a subset of the candidate items for retrieval.

In an alternate implementation, the relevancy scores generated in step 608 are used to rank some or all of the candidate items based on the relevancy scores associated therewith. For example, content item ranker 304 of personalized retrieval system 128 may implement method 600 to rank the content items identified in list 322 that is received from content item retriever.

Figure 7:
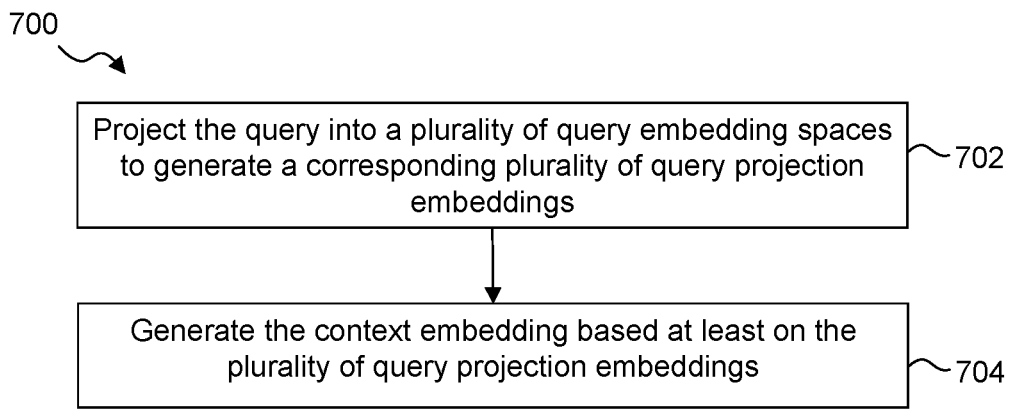
FIG. 7 illustrates a flow diagram of a method for generating a context embedding in a vector space, according to some embodiments.

FIG. 7 is a flow diagram for a method 700 for generating a context embedding in a vector space, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIGS. 3 and 4. However, method 700 is not limited to that example embodiment.

In 702, query projection embedding layers 410, 412 and 414 project query 320 into a plurality of query embedding spaces to generate a corresponding plurality of query projection embeddings.

In 704, context tower 402 generates context embedding 424 based at least on the plurality of query projection embeddings generated during step 702.

Figure 8:
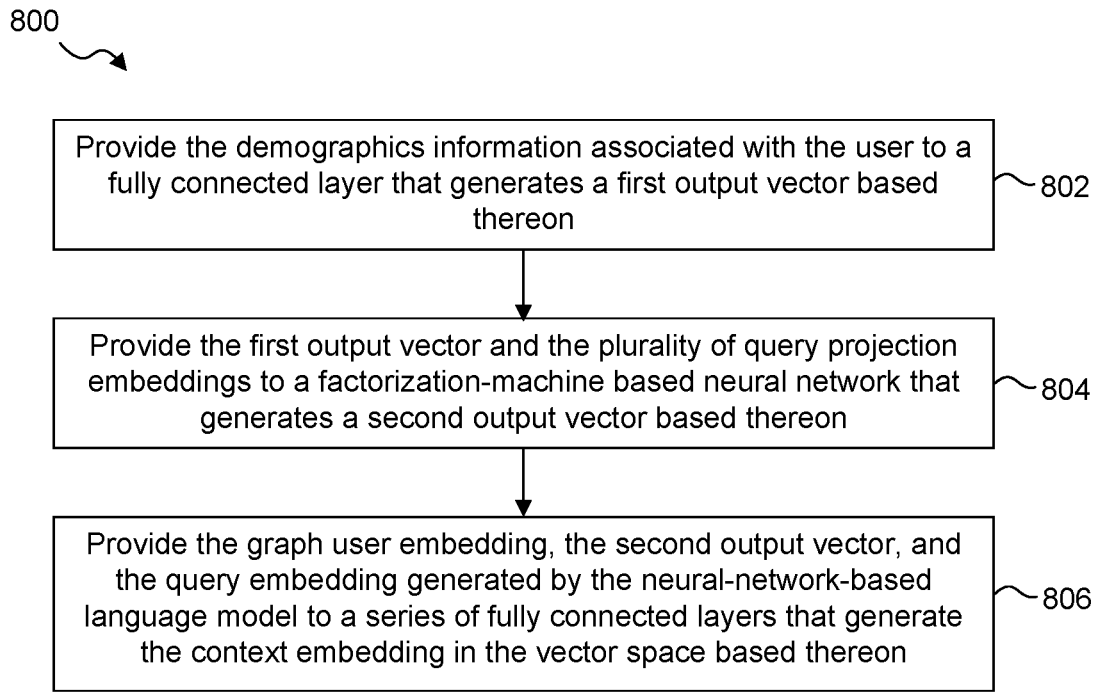
FIG. 8 illustrates a flow diagram of another method for generating a context embedding in a vector space, according to some embodiments.

FIG. 8 is a flow diagram for a method 800 for generating a context embedding in a vector space, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIGS. 3 and 4. However, method 800 is not limited to that example embodiment.

In 802, context tower 402 provides user demographics information 404 to fully connected layer 408 that generates a first output vector based thereon.

In 804, context tower 402 provides the first output vector and the plurality of query projection embeddings generated by query projection embedding layers 410, 412 and 414, respectively, to FM-based neural network 418 that generates a second output vector based thereon.

In 806, context tower 402 provides graph user embedding 416, the second output vector, and domain-tuned language model query embedding 420 to series of fully connected layers 422 that generate context embedding 424 in the vector space based thereon.

Figure 9:
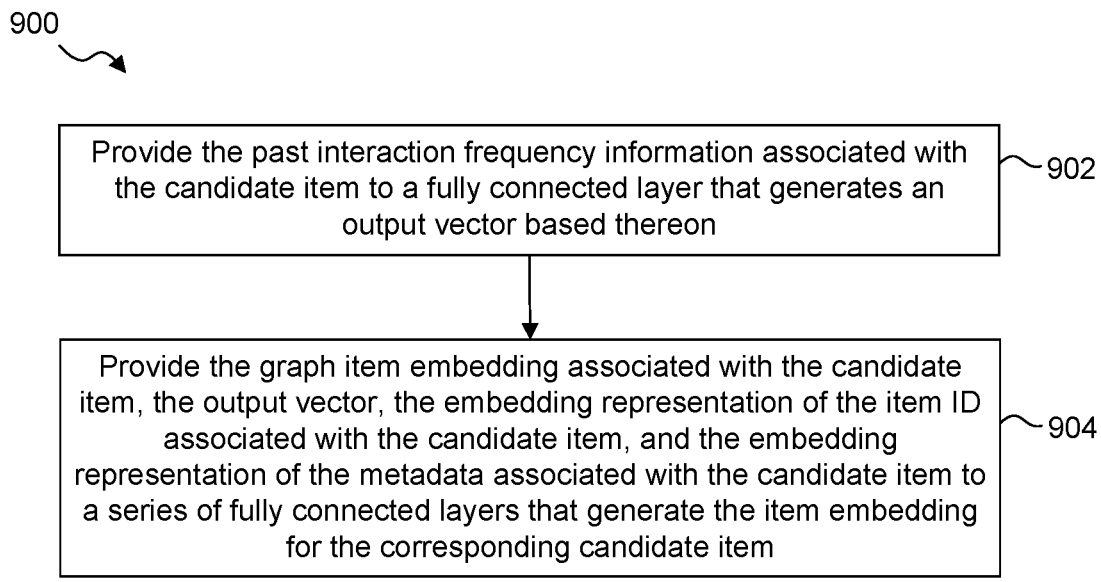
FIG. 9 illustrates a flow diagram of a method for generating an item embedding corresponding to a candidate item in a vector space, according to some embodiments.

FIG. 9 is a flow diagram for a method 900 for generating an item embedding corresponding to a candidate item in a vector space, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIGS. 3 and 4. However, method 900 is not limited to that example embodiment.

In 902, item tower 430 provides information indicative of a popularity level of the candidate item (e.g., item popularity statistics 432) to fully connected layer 432 that generates an output vector based thereon.

In 904, item tower 430 provides graph item embedding 438 associated with the candidate item, the output vector, the embedding representation of the item ID associated with the candidate item generated by item ID embedding layer 442, and the embedding representation of the metadata associated with the candidate item generate by item metadata embedding layer 444 to series of fully connected layers 446 that generate item embedding 448 for the candidate item.

Figure 10:
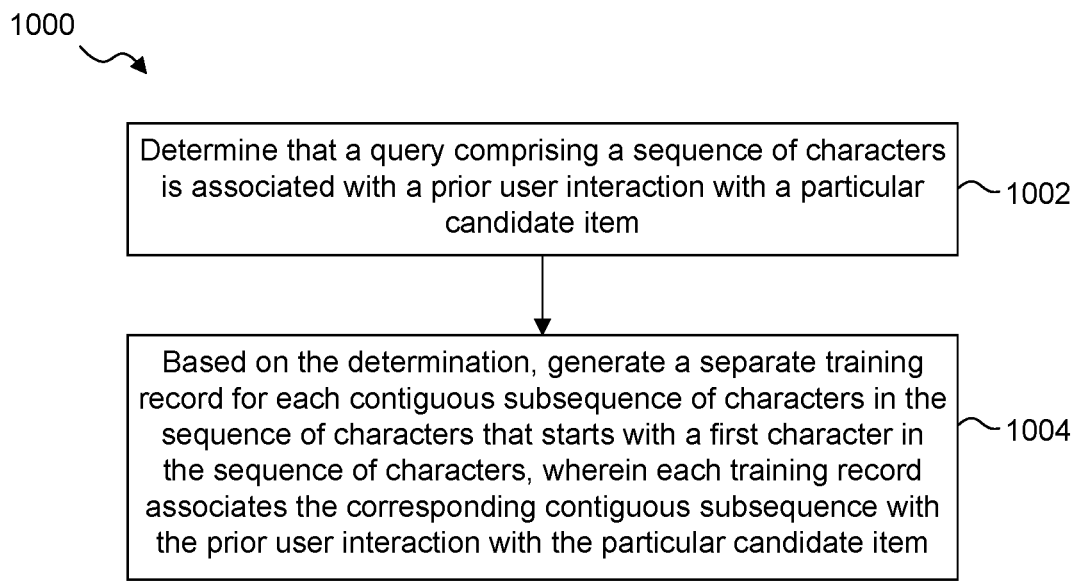
FIG. 10 illustrates a flow diagram of a method for generating training data for training an ML model, according to some embodiments.

FIG. 10 is a flow diagram for a method 1000 for generating training data for training an ML model, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 5. However, method 1000 is not limited to that example embodiment.

In 1002, training data generator 504 determines that a query comprising a sequence of characters is associated with a prior user interaction with a particular candidate item.

In 1004, based on the determination, training data generator 504 generates a separate training record for each contiguous subsequence of characters in the sequence of characters that starts with a first character in the sequence of characters, wherein each training record associates the corresponding contiguous subsequence with the prior user interaction with the particular candidate item.

Example Computer System

Figure 11:
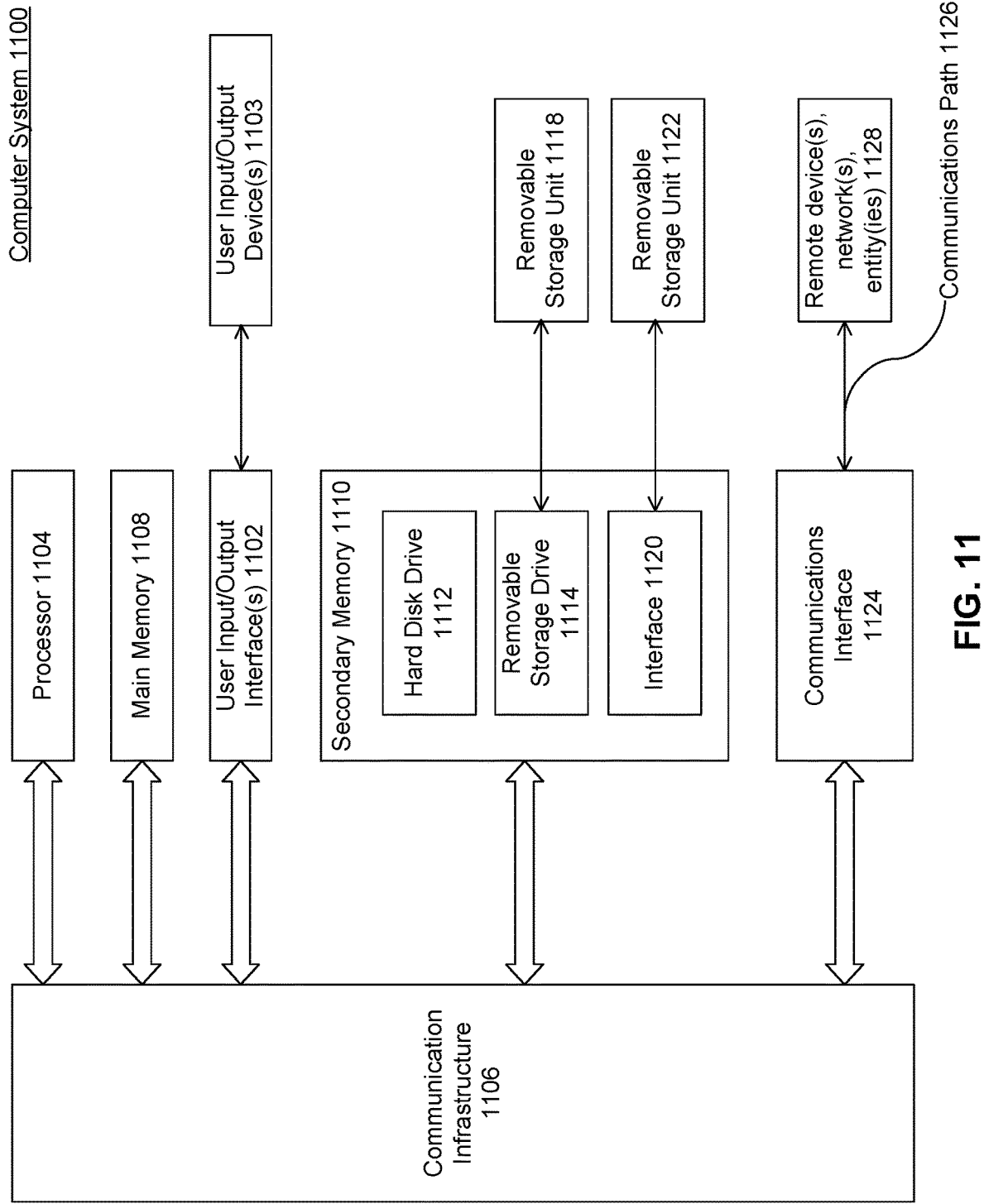
FIG. 11 illustrates an example computer system useful for implementing various embodiments.

Various embodiments may be implemented, for example, using one or more well-known computer systems, such as computer system 1100 shown in FIG. 11. For example, one or more of media device 106, remote control 110, content servers 120, system servers 126, personalized retrieval system 128, relevancy scoring ML model 316, or system 500 may be implemented using combinations or sub-combinations of computer system 1100. Also or alternatively, one or more computer systems 1100 may be used, for example, to implement any of the embodiments discussed herein, as well as combinations and sub-combinations thereof.

Computer system 1100 may include one or more processors (also called central processing units, or CPUs), such as a processor 1104. Processor 1104 may be connected to a communication infrastructure or bus 1106.

Computer system 1100 may also include user input/output device(s) 1103, such as monitors, keyboards, pointing devices, etc., which may communicate with communication infrastructure 1106 through user input/output interface(s) 1102.

One or more of processors 1104 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1100 may also include a main or primary memory 1108, such as random access memory (RAM). Main memory 1108 may include one or more levels of cache. Main memory 1108 may have stored therein control logic (i.e., computer software) and/or data.

Computer system 1100 may also include one or more secondary storage devices or memory 1110. Secondary memory 1110 may include, for example, a hard disk drive 1112 and/or a removable storage device or drive 1114. Removable storage drive 1114 may be a floppy disk drive, a magnetic tape drive, a compact disk drive, an optical storage device, tape backup device, and/or any other storage device/drive.

Removable storage drive 1114 may interact with a removable storage unit 1118. Removable storage unit 1118 may include a computer usable or readable storage device having stored thereon computer software (control logic) and/or data. Removable storage unit 1118 may be a floppy disk, magnetic tape, compact disk, DVD, optical storage disk, and/any other computer data storage device. Removable storage drive 1114 may read from and/or write to removable storage unit 1118.

Secondary memory 1110 may include other means, devices, components, instrumentalities or other approaches for allowing computer programs and/or other instructions and/or data to be accessed by computer system 1100. Such means, devices, components, instrumentalities or other approaches may include, for example, a removable storage unit 1122 and an interface 1120. Examples of the removable storage unit 1122 and the interface 1120 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1100 may further include a communication or network interface 1124. Communication interface 1124 may enable computer system 1100 to communicate and interact with any combination of external devices, external networks, external entities, etc. (individually and collectively referenced by reference number 1128). For example, communication interface 1124 may allow computer system 1100 to communicate with external or remote devices 1128 over communications path 1126, which may be wired and/or wireless (or a combination thereof), and which may include any combination of LANs, WANs, the Internet, etc. Control logic and/or data may be transmitted to and from computer system 1100 via communication path 1126.

Computer system 1100 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1100 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1100, main memory 1108, secondary memory 1110, and removable storage units 1118 and 1122, as well as tangible articles of manufacture embodying any combination of the foregoing. Such control logic, when executed by one or more data processing devices (such as computer system 1100 or processor(s) 1104), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 11. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for calculating a relevancy score for each of a plurality of candidate items based on a query, comprising:
    providing, by at least one computer processor, input to a context tower of a two-tower deep machine learning (ML) model that comprises the context tower and an item tower, the input including:
        the query, and
        a graph user embedding corresponding to a user associated with the query and generated by a graph neural network (GNN) based at least on past interactions between the user and one or more candidate items in the plurality of candidate items;
    generating, by the context tower and based at least on the input, a context embedding in a vector space, wherein the generating the context embedding comprises:
        generating a first output vector by providing demographics information associated with the user to a fully connected layer of the context tower;
        generating a second output vector by providing, to a factorization-machine based neural network of the context tower, the first output vector and a plurality of query projection embeddings; and
        generating the context embeddings by providing at least the second output vector to a series of fully connected layers of the context tower;
    determining, by the two-tower deep ML model, a measure of similarity between the context embedding and each of a plurality of item embeddings in the vector space, wherein each item embedding of the plurality of item embeddings is generated by the item tower and represents a corresponding item in the plurality of candidate items; and
    calculating the relevancy score for each candidate item in the plurality of candidate items based on the determined measure of similarity between the context embedding and the item embedding corresponding to the respective candidate item.

2. The computer-implemented method of claim 1, further comprising:
    selecting a subset of the candidate items for retrieval based on the relevancy scores associated therewith; or
    ranking some or all of the candidate items based on the relevancy scores associated therewith.

3. The computer-implemented method of claim 1, wherein the input further comprises:
    a query embedding corresponding to the query and generated by a neural-network-based language model trained on a text corpus and then tuned based on training data generated from logs of previously-submitted queries and associated user-item interactions.

4. The computer-implemented method of claim 3, wherein the input further comprises:
    the demographics information associated with the user.

5. The computer-implemented method of claim 4, wherein the generating the context embedding comprises:
    generating the corresponding plurality of query projection embedding by projecting the query into a plurality of query embedding spaces; and
    generating the context embedding based at least on the graph user embedding, the query embedding generated by the neural-network-based language model, the demographics information associated with the user, and the plurality of query projection embeddings.

6. The computer-implemented method of claim 5, wherein the generating the context embedding comprises:
    generating the context embeddings by providing the graph user embedding, the second output vector, and the query embedding generated by the neural-network-based language model to the series of fully connected layers.

7. The computer-implemented method of claim 1, further comprising:
    generating, by the item tower, each item embedding of the plurality of item embeddings based at least on:
        information indicative of a popularity level of the corresponding candidate item,
        an item identifier (ID) associated with the corresponding candidate item,
        metadata associated with the corresponding candidate item, and
        a graph item embedding generated by the GNN and associated with the corresponding candidate item.

8. The computer-implemented method of claim 7, wherein the generating each item embedding of the plurality of item embeddings comprises:
    providing the information indicative of the popularity level of the corresponding candidate item to a fully connected layer that generates an output vector based thereon;
    generating an embedding representation of the item ID associated with the corresponding candidate item;
    generating an embedding representation of the metadata associated with the corresponding candidate item; and
    providing the graph item embedding associated with the corresponding candidate item, the output vector, the embedding representation of the item ID associated with the corresponding candidate item, and the embedding representation of the metadata associated with the corresponding candidate item to another series of fully connected layers that generate the item embedding for the corresponding candidate item.

9. The computer-implemented method of claim 1, further comprising:
    generating training data for training the two-tower deep ML model by:

determining that a query comprising a sequence of characters is associated with a prior user interaction with a particular candidate item, and based on the determination, generating a separate training record for each contiguous subsequence of characters in the sequence of characters that starts with a first character in the sequence of characters, wherein each training record associates the corresponding contiguous subsequence with the prior user interaction with the particular candidate item.

10. The computer-implemented method of claim 1, further comprising:

training the two-tower deep ML model by minimizing a loss function that includes:
  a first term that represents categorical cross entropy for multiple candidate classification,
  a second term that represents binary cross entropy to predict probability of a first type of user-item interaction, and
  a third term that represents binary cross entropy to predict probability of a second type of user-item interaction.

11. A system for calculating a relevancy score for each of a plurality of candidate items based on a query, comprising:

one or more memories; and at least one processor each coupled to at least one of the memories and configured to perform operations comprising:
  providing input to a context tower of a two-tower deep machine learning (ML) model that comprises the context tower and an item tower, the input including:
    the query, and
    a query embedding corresponding to the query and generated by a neural-network-based language model trained on a text corpus and tuned based on training data generated from logs of previously-submitted queries and associated user-item interactions;
  generating, by the context tower and based at least on the input, a context embedding in a vector space, wherein the generating the context embedding comprises:
    generating a first output vector by providing demographics information associated with a user associated with the query to a fully connected layer of the context tower;
    generating a second output vector by providing the first output vector and a plurality of query projection embeddings to a factorization-machine based neural network of the context tower;
    generating the context embeddings by providing at least the second output vector to a series of fully connected layers of the context tower; and
  determining, by the two-tower deep ML model, a measure of similarity between the context embedding and each of a plurality of item embeddings in the vector space, wherein each item embedding of the plurality of item embeddings is generated by the item tower and represents a corresponding item in the plurality of candidate items; and
  calculating the relevancy score for each candidate item in the plurality of candidate items based on the determined measure of similarity between the context embedding and the item embedding corresponding to the respective candidate item.

12. The system of claim 11, wherein the operations further comprise:

selecting a subset of the candidate items for retrieval based on the relevancy scores associated therewith; or ranking some or all of the candidate items based on the relevancy scores associated therewith.

13. The system of claim 11, wherein the input further comprises:

a graph user embedding corresponding to the user and generated by a graph neural network (GNN) based at least on past interactions between the user and one or more candidate items in the plurality of candidate items.

14. The system of claim 13, wherein the input further comprises:

the demographics information associated with the user.

15. The system of claim 14, wherein the generating the context embedding comprises:

generating the corresponding plurality of query projection embedding by projecting the query into a plurality of query embedding spaces; and generating the context embedding based at least on the graph user embedding, the query embedding generated by the neural-network-based language model, the demographics information associated with the user, and the plurality of query projection embeddings.

16. The system of claim 15, wherein the generating the context embedding comprises:

generating the context embeddings by providing the graph user embedding, the second output vector, and the query embedding generated by the neural-network-based language model to the series of fully connected layers.

17. The system of claim 11, wherein the operations further comprise:

generating, by the item tower, each item embedding of the plurality of item embeddings based on:
  information indicative of a popularity level of the corresponding candidate item,
  an item identifier (ID) associated with the corresponding candidate item,
  metadata associated with the corresponding candidate item, and
  a graph item embedding generated by the GNN and associated with the corresponding candidate item.

18. The system of claim 17, wherein the generating each item embedding of the plurality of item embeddings comprises:

providing the information indicative of the popularity level of the corresponding candidate item to a fully connected layer that generates an output vector based thereon;

generating an embedding representation of the item ID associated with the corresponding candidate item;

generating an embedding representation of the metadata associated with the corresponding candidate item; and providing the graph item embedding associated with the corresponding candidate item, the output vector, the embedding representation of the item ID associated with the corresponding candidate item, and the embedding representation of the metadata associated with the corresponding candidate item to another series of fully connected layers that generate the item embedding for the corresponding candidate item.

19. The system of claim 11, wherein the operations further comprise:

generating training data for training the two-tower deep ML model by:

determining that a query comprising a sequence of characters is associated with a prior user interaction with a particular candidate item, and based on the determination, generating a separate training record for each contiguous subsequence of characters in the sequence of characters that starts with a first character in the sequence of characters, wherein each training record associates the corresponding contiguous subsequence with the prior user interaction with the particular candidate item.

20. The system of claim 11, wherein the operations further comprise:

training the two-tower deep ML model by minimizing a loss function that includes:
  a first term that represents categorical cross entropy for multiple candidate classification,
  a second term that represents binary cross entropy to predict probability of a first type of user-item interaction, and
  a third term that represents binary cross entropy to predict probability of a second type of user-item interaction.

21. A non-transitory computer-readable medium having instructions stored thereon that, when executed by at least one computing device, cause the at least one computing device to perform operations for calculating a relevancy score for each of a plurality of candidate items based on a query, the operations comprising:

providing input to a context tower of a two-tower deep machine learning (ML) model that comprises the context tower and an item tower, the input comprising:
  the query,
  a graph user embedding corresponding to a user associated with the query and generated by a graph neural network (GNN) based at least on past interactions between the user and one or more candidate items in the plurality of candidate items, and
  a query embedding corresponding to the query and generated by a neural-network-based language model trained on a text corpus and then tuned based on training data generated from logs of previously-submitted queries and associated user-item interactions;

generating, by the context tower and based at least on the input, a context embedding in a vector space, wherein the generating the context embedding comprises:

generating a first output vector by providing demographics information associated with the user to a fully connected layer of the context tower;

generating a second output vector by providing the first output vector to a factorization-machine based neural network of the context tower; and generating the context embeddings by providing at least the second output vector to a series of fully connected layers of the context tower;

determining, by the two-tower deep ML model, a measure of similarity between the context embedding and each of a plurality of item embeddings in the vector space, wherein each item embedding of the plurality of item embeddings is generated by the item tower and represents a corresponding item in the plurality of candidate items; and calculating the relevancy score for each candidate item in the plurality of candidate items based on the determined measure of similarity between the context embedding and the item embedding corresponding to the respective candidate item.

22. The non-transitory computer-readable medium of claim 21, wherein the operations further comprise:
  selecting a subset of the candidate items for retrieval based on the relevancy scores associated therewith; or
  ranking some or all of the candidate items based on the relevancy scores associated therewith.

23. The non-transitory computer-readable medium of claim 21, wherein the input further comprises:
  the demographics information associated with the user.

24. The non-transitory computer-readable medium of claim 23, wherein the generating the context embedding comprises:
  generating the corresponding plurality of query projection embedding by projecting the query into a plurality of query embedding spaces; and
  generating the context embedding based at least on the graph user embedding, the query embedding generated by the neural-network-based language model, the demographics information associated with the user, and the plurality of query projection embeddings.

25. The non-transitory computer-readable medium of claim 24, wherein the generating the context embedding comprises:
  generating the context embedding by providing the graph user embedding, the second output vector, and the query embedding generated by the neural-network-based language model to the series of fully connected layers.

26. The non-transitory computer-readable medium of claim 21, wherein the operations further comprise:
  generating, by the item tower, each item embedding of the plurality of item embeddings based on:
    information indicative of a popularity level of the corresponding candidate item,
    an item identifier (ID) associated with the corresponding candidate item,
    metadata associated with the corresponding candidate item, and
    a graph item embedding generated by the GNN and associated with the corresponding candidate item.

27. The non-transitory computer-readable medium of claim 26, wherein the generating each item embedding of the plurality of item embeddings comprises:
  providing the information indicative of the popularity level of the corresponding candidate item to a fully connected layer that generates an output vector based thereon;
  generating an embedding representation of the item ID associated with the corresponding candidate item;
  generating an embedding representation of the metadata associated with the corresponding candidate item; and
  providing the graph item embedding associated with the corresponding candidate item, the output vector, the embedding representation of the item ID associated with the corresponding candidate item, and the embedding representation of the metadata associated with the corresponding candidate item to another series of fully connected layers that generate the item embedding for the corresponding candidate item.

28. The non-transitory computer-readable medium of claim 21, wherein the operations further comprise:
  generating training data for training the two-tower deep ML model by:
    determining that a query comprising a sequence of characters is associated with a prior user interaction with a particular candidate item, and based on the determination, generating a separate training record for each contiguous subsequence of characters in the sequence of characters that starts with a first character in the sequence of characters, wherein each training record associates the corresponding contiguous subsequence with the prior user interaction with the particular candidate item.

29. The non-transitory computer-readable medium of claim 21, wherein the operations further comprise:
training the two-tower deep ML model by minimizing a loss function that includes:
a first term that represents categorical cross entropy for multiple candidate classification,
a second term that represents binary cross entropy to predict probability of a first type of user-item interaction, and
a third term that optimizes binary cross entropy to predict probability of a second type of user-item interaction.

* * * * *

UNITED STATES PATENT AND TRADEMARK OFFICE
CERTIFICATE OF CORRECTION

PATENT NO. : 12,493,653 B2  
APPLICATION NO. : 18/398495  
DATED : December 9, 2025  
INVENTOR(S) : Kumar et al.

Page 1 of 1

It is certified that error appears in the above-identified patent and that said Letters Patent is hereby corrected as shown below:

In the Claims

In Column 21, Claim 1, Line 34, delete "including;" and insert -- including: --, therefor.

Signed and Sealed this  
Tenth Day of February, 2026

John A. Squires  
*Director of the United States Patent and Trademark Office*